(12) United States Patent
Shang

(10) Patent No.: US 10,559,946 B1
(45) Date of Patent: Feb. 11, 2020

(54) PANEL-TYPE ELECTRICAL DEVICE AND ELECTRICAL ASSEMBLY

(71) Applicant: Schneider Electric (Australia) Pty. Ltd., Macquarie Park (AU)

(72) Inventor: Pei Shang, Shenzhen (CN)

(73) Assignee: Schneider Electric (Australia) Pty Ltd, Macquarie Park (AU)

( * ) Notice: Subject to any disclaimer, the term of this patent is extended or adjusted under 35 U.S.C. 154(b) by 0 days.

(21) Appl. No.: 16/165,428

(22) Filed: Oct. 19, 2018

(51) Int. Cl.
| H02B 1/42 | (2006.01) |
| H02B 1/04 | (2006.01) |
| H02B 1/044 | (2006.01) |
| H02G 3/14 | (2006.01) |

(52) U.S. Cl.
CPC ............. *H02B 1/042* (2013.01); *H02B 1/044* (2013.01); *H02G 3/14* (2013.01)

(58) Field of Classification Search
CPC ........................................................ H02B 1/42
USPC ........................................................ 174/520
See application file for complete search history.

(56) References Cited

U.S. PATENT DOCUMENTS

2008/0146078 A1* 6/2008 Braathen ................ H01R 13/74
439/536

* cited by examiner

*Primary Examiner* — Stanley Tso
(74) *Attorney, Agent, or Firm* — Locke Lord LLP

(57) ABSTRACT

Embodiments of the present disclosure provide a panel-type electrical device. The panel-type electrical device comprises a socket assembly adapted to be coupled to a mounting surface and including a socket body and a first pair of mounting parts; a switch assembly adapted to be coupled to the mounting surface side by side with the socket assembly and including a switch body and a second pair of mounting parts, each of the mounting parts including a first surface facing toward the mounting surface and a second surface facing away from the mounting surface; a socket panel adapted to cover the socket body; a switch panel adapted to cover the switch body and move between at least two positions to control an operation state of the switch body, the switch panel being coplanar with the socket panel in one of the at least two positions; and a first pair of cushion blocks adapted to be arranged between the mounting surface and the first surface of the corresponding mounting parts of the socket assembly such that the socket body abuts the switch panel.

16 Claims, 15 Drawing Sheets

PANEL-TYPE ELECTRICAL DEVICE AND ELECTRICAL ASSEMBLY

FIELD

Embodiments of the present disclosure generally relate to electrical device, and more specifically, to a panel-type electrical device and an electrical assembly.

BACKGROUND

Panel-type electrical devices, such as a wall switch and a wall socket, are widely used in various places, such as home, office, stadium, workshop, and the like. In some situations, multiple such devices need to be arranged side by side on the wall to provide desired functionalities. Typically, the switch and the socket may be arranged side by side on a dark junction box in the wall.

In order to make an overall appearance of a final product including the switch and the socket tidy and beautiful, a switch panel and a socket panel are usually provided to cover the switch and the socket respectively. The switch panel may be movable between at least two positions to control an operation state of the switch, such as a close state or an open state. In addition, the switch panel needs to be coplanar with the socket panel in one of the at least two positions so as to provide a tidy appearance.

The switch panel is typically large so as to achieve the control of the switch, rendering an overall height of the switch panel and the switch being increased. In order to make the switch panel and the socket panel coplanar with each other, it is known to arrange the socket panel above the socket with a gap between them. However, such a gap will reduce reliability of the product.

SUMMARY

In a first aspect, embodiments of the present disclosure provide a panel-type electrical device. The panel-type electrical device comprises a socket assembly adapted to be coupled to a mounting surface and including a socket body and a first pair of mounting parts; a switch assembly adapted to be coupled to the mounting surface side by side with the socket assembly and including a switch body and a second pair of mounting parts, each of the mounting parts including a first surface facing toward the mounting surface and a second surface facing away from the mounting surface; a socket panel adapted to cover the socket body; a switch panel adapted to cover the switch body and move between at least two positions to control an operation state of the switch body, the switch panel being coplanar with the socket panel in one of the at least two positions; and a first pair of cushion blocks adapted to be arranged between the mounting surface and the first surface of the corresponding mounting parts of the socket assembly such that the socket body abuts the switch panel.

In some embodiments, the first pair of cushion blocks are integrally formed on the corresponding mounting parts of the socket assembly and foldable between a first position and a second position relative to the corresponding mounting parts of the socket assembly, and the first pair of cushion blocks are in contact with the first surface of the corresponding mounting parts of the socket assembly in the first position and in contact with the second surface of the corresponding mounting parts of the socket assembly in the second position.

In some embodiments, the first pair of cushion blocks are separate from the corresponding mounting parts of the socket assembly.

In some embodiments, the panel-type electrical device further comprises a second pair of cushion blocks adapted to be arranged on the second surface of the corresponding mounting parts of the switch assembly, and an overall thickness of one of the first pair of mounting parts and the corresponding cushion block is substantially equal to that of one of the second pair of mounting parts and the corresponding cushion block.

In some embodiments, the second pair of cushion blocks are integrally formed on the corresponding mounting parts of the switch assembly and foldable between a first position and a second position relative to the corresponding mounting parts of the switch assembly, and the second pair of cushion blocks are in contact with the first surface of the corresponding mounting parts of the switch assembly in the first position and in contact with the second surface of the corresponding mounting parts of the switch assembly in the second position.

In some embodiments, the second pair of cushion blocks are separate from the corresponding mounting parts of the switch assembly In some embodiments, each of the mounting parts comprises a first screw hole, and the socket assembly and the switch assembly are mounted on the mounting surface by screws passing through the respective first screw hole.

In some embodiments, each of the first pair of cushion blocks comprises a first through hole aligned with the first screw hole.

In some embodiments, the panel-type electrical device further comprises a bracket coupled to the mounting parts of the socket assembly and the switch assembly and comprising windows for exposing the socket body and the switch body; and a frame coupled to the bracket and adapted to support the socket panel and the switch panel.

In some embodiments, each of the mounting parts comprises a second screw hole, the bracket comprises a plurality of third screw holes corresponding to the second screw hole, and the bracket is coupled to the mounting parts by screws passing through the plurality of third screw holes and the respective second screw hole.

In some embodiments, each of the first pair of cushion blocks comprises a second through hole aligned with the second screw hole.

In some embodiments, each of the first pair of cushion blocks comprises a positioning part, and the bracket comprises positioning grooves adapted to receive the respective positioning part.

In some embodiments, the frame is coupled to the bracket through snap-fitting.

In some embodiments, the socket panel is fixedly mounted on the frame through snap-fitting.

In some embodiments, the frame comprises a pair of positioning pillars, and the switch panel comprises a pair of notches rotatably mounted on the corresponding positioning pillars.

In some embodiments, the panel-type electrical device further comprises at least one additional socket assembly or at least one additional switch assembly.

In a second aspect, embodiments of the present disclosure provide an electrical assembly. The electrical assembly comprises a body; a pair of mounting parts arranged on opposite sides of the body, the electrical assembly being adapted to be arranged on a mounting surface via the mounting parts, each of the mounting parts including a first surface facing toward the mounting surface and a second surface facing away from the mounting surface; and a pair of cushion blocks integrally formed on the corresponding mounting parts and foldable between a first position and a second position relative to the corresponding mounting parts, the pair of cushion blocks being in contact with the first surface of the corresponding mounting parts in the first position and in contact with the second surface of the corresponding mounting parts in the second position.

In some embodiments, each of the mounting parts comprises a first screw hole, and the electrical assembly is mounted on the mounting surface by screws passing through the respective first screw hole.

In some embodiments, each of the cushion blocks comprises a first through hole aligned with the first screw hole in the first position or the second position.

In some embodiments, the body comprises a socket body or a switch body.

It is to be understood that the Summary is not intended to identify key or essential features of embodiments of the present disclosure, nor is it intended to be used to limit the scope of the present disclosure. Other features of the present disclosure will become easily comprehensible through the description below.

BRIEF DESCRIPTION OF THE DRAWINGS

The above and other objectives, features and advantages of the present disclosure will become more apparent through more detailed depiction of example embodiments of the present disclosure in conjunction with the accompanying drawings, wherein in the example embodiments of the present disclosure, same reference numerals usually represent same components.

Throughout the drawings, the same or similar reference symbols are used to indicate the same or similar elements.

DETAILED DESCRIPTION

Embodiments of the present disclosure will now be discussed with reference to several example embodiments. It is to be understood these embodiments are discussed only for the purpose of enabling those skilled persons in the art to better understand and thus implement the present disclosure, rather than suggesting any limitations on the scope of the subject matter.

As used herein, the term "comprises" and its variants are to be read as open terms that mean "comprises, but is not limited to." The term "based on" is to be read as "based at least in part on." The term "one embodiment" and "an embodiment" are to be read as "at least one embodiment." The term "another embodiment" is to be read as "at least one other embodiment." The terms "first," "second," and the like may refer to different or same objects. Other definitions, explicit and implicit, may be comprised below. A definition of a term is consistent throughout the description unless the context clearly indicates otherwise.

As discussed above, in a conventional way for assembling the panel-type electrical devices, the switch panel is typically large so as to achieve the control of the switch, rendering the overall height of the switch panel and the switch being increased. In order to make the switch panel and the socket panel coplanar with each other, the socket panel may be arranged above the socket with a gap between them; however, such a gap may adversely affect the reliability of the panel-type electrical devices.

In order to at least partially address the above and other potential problems, embodiments of the present disclosure provide a panel-type electrical device 100. Now some example embodiments will be described with reference to FIGS. 1-12C.

Figure 1:
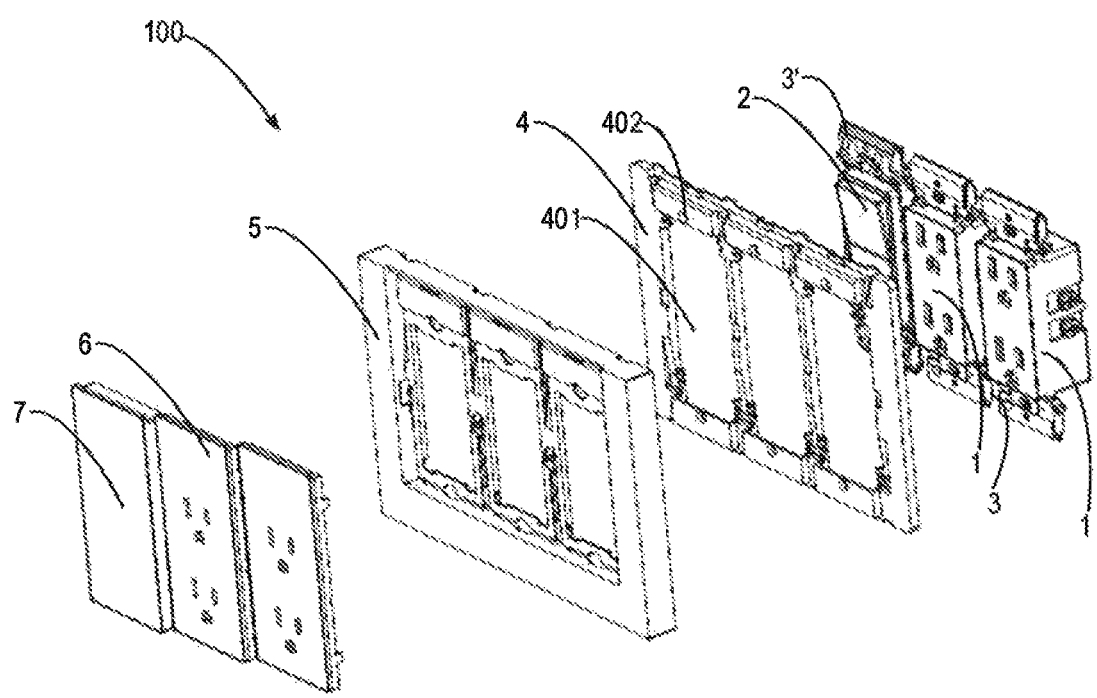
FIG. 1 shows an exploded view of a panel-type electrical device according to an embodiment of the present disclosure.

FIG. 1 shows an exploded view of a panel-type electrical device 100 according to an embodiment of the present disclosure. As shown in FIG. 1, the panel-type electrical device 100 includes a switch assembly 2 and a socket assembly 1 adjacent to the switch assembly 2. The socket assembly 1 and the switch assembly 2 may be arranged side by side on a mounting surface (not shown), such as the surface of a dark junction box in the wall. In some embodiments, the panel-type electrical device 100 may further include at least one additional socket assembly 1, such as the socket assembly 1 on the right hand side of FIG. 1. In some embodiments, the panel-type electrical device 100 may include at least one additional switch assembly 2 (not shown). Those socket assemblies 1 and switch assemblies 2 may be arranged side by side on the mounting surface.

It is to be understood that though just one switch assembly 2 and two socket assemblies 1 are illustrated, it is merely for the purpose of illustration without suggesting any limitations as to the scope of the present disclosure.

Figure 2:
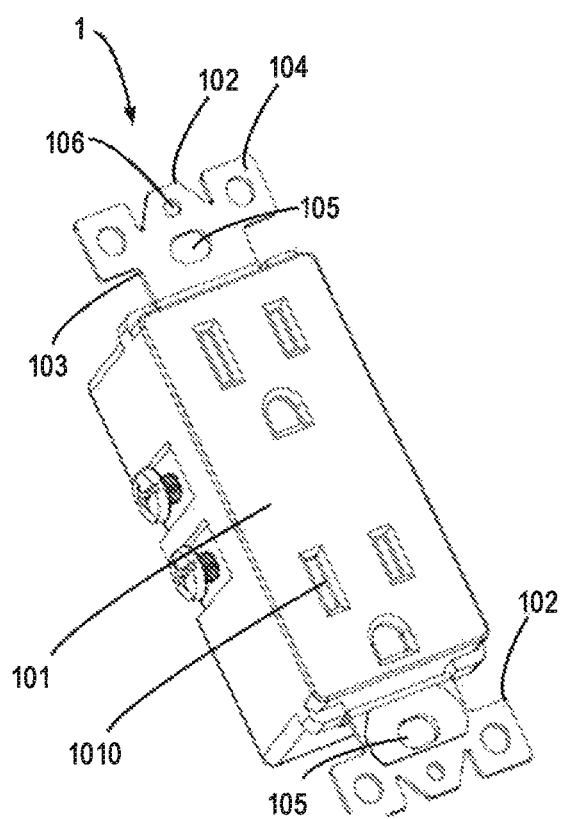
FIG. 2 shows a perspective view of a socket assembly according to an embodiment of the present disclosure.
Figure 3:
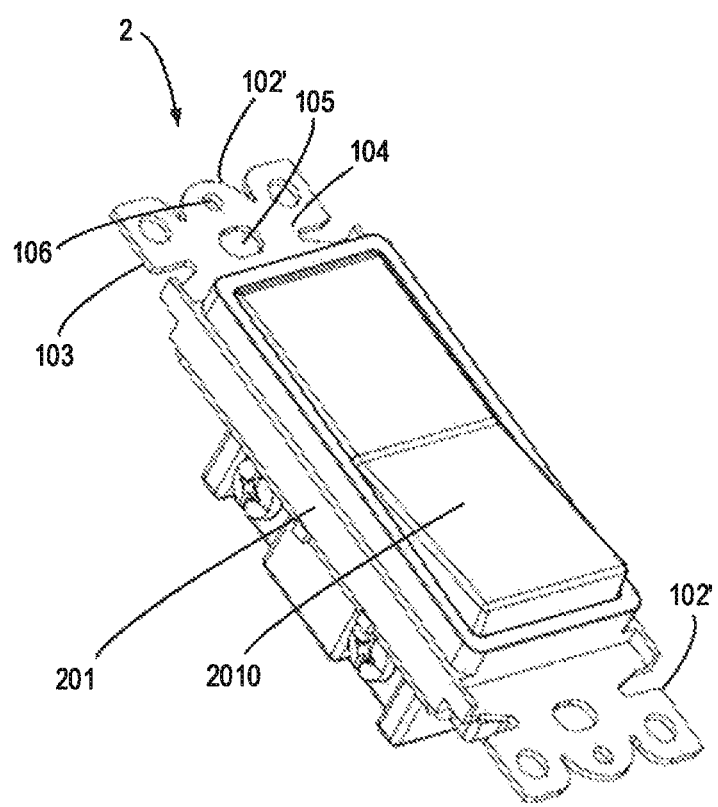
FIG. 3 shows a perspective view of a switch assembly according to an embodiment of the present disclosure.

Example structures of the socket assembly 1 and the switch assembly 2 are shown in FIGS. 2 and 3 respectively. As shown in FIG. 2, the socket assembly 1 comprises a socket body 101 and a first pair of mounting parts 102 arranged on opposite sides of the socket body 101. The socket assembly 1 may be fixed onto the mounting surface via the mounting parts 102, for example. The socket body 101 may include internal functional components (not shown) and at least a group of socket apertures 1010.

As shown in FIG. 3, the switch assembly 2 comprises a switch body 201 and a second pair of mounting parts 102' arranged on opposite sides of the switch body 201. The switch assembly 2 may be arranged on the mounting surface via the mounting parts 102'. The switch body 201 may include internal functional components (not shown) and a button 2010. In response to being pressed, the button 2010 may be switched between at least two states, such as an open state and a close state.

In some embodiments, the mounting parts 102, 102' may be formed as metal sheets. Alternatively, in other embodiments, the mounting parts 102, 102' may be made into other forms. As shown in FIGS. 2 and 3, each of the mounting parts 102, 102' comprises a first surface 103 facing toward the mounting surface and a second surface 104 facing away from the mounting surface.

In order to make an overall appearance of the panel-type electrical device 100 tidy and beautiful, the electrical device 100 further includes a socket panel 6 and a switch panel 7, as shown in FIGS. 1-3. The socket panel 6 may cover the socket body 101. The switch panel 7 may cover the switch body 201 and move between at least two positions, such as a close position and an open position, to control an operation state of the switch body 201. For example, the switch panel 7, upon being pressed, switches the button 2010 between the open state and the close state.

In order to provide a tidy appearance, in some embodiments, the switch panel 7 may be coplanar with the socket panel 6 in one of the above positions. For example, the switch panel 7 may be coplanar with the socket panel 6 in the close position, and may be at an angle with respect to the socket panel 6 in the open position. In other embodiments, the switch panel 7 may be coplanar with the socket panel 6 in the open position and at an angle with respect to the socket panel 6 in the close position. In other embodiments, in addition to the close position and the open position, the switch panel 7 may be placed in other intermediate positions.

Figure 4:
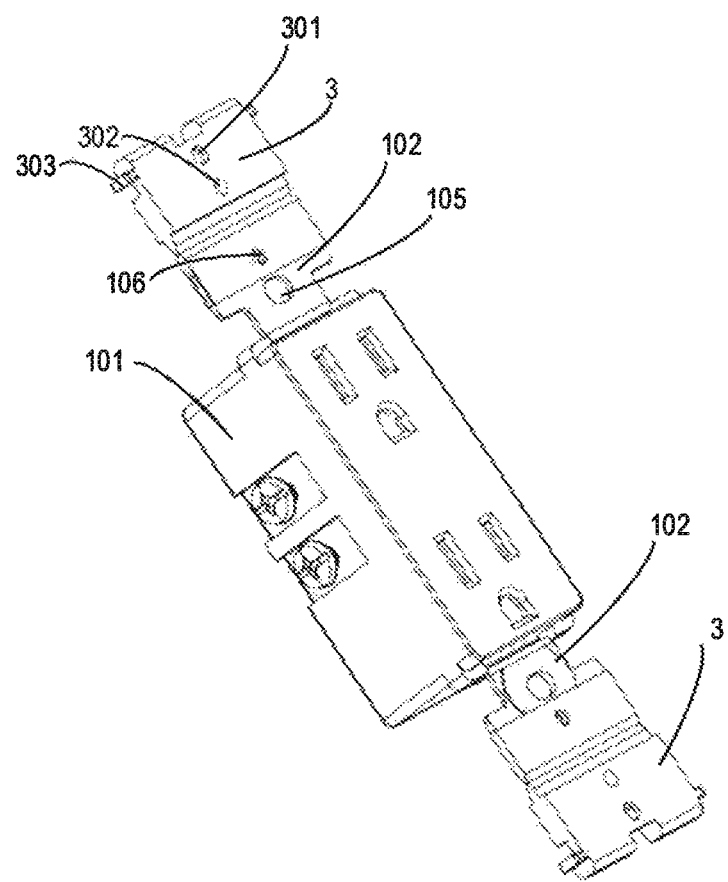
FIG. 4 shows a perspective view of a first pair of cushion blocks formed on the socket assembly according to an embodiment of the present disclosure.

In some embodiments, as shown in FIGS. 1 and 4, a first pair of cushion blocks 3 are provided to increase the height of the socket body 101 with respect to the mounting surface, so that the switch panel 7 and the socket panel 6 can be coplanar with each other and the gap between the socket body 101 and the socket panel 6 can be reduced or eliminated. In some embodiments, the cushion blocks 3 are arranged between the mounting surface and the first surface 103 of the corresponding mounting parts 102 of the socket assembly 1. In this way, the socket body 101 will abut the switch panel 7. Through arranging the cushion blocks 3 between the mounting surface and the first surface 103, the gap between the socket body 101 and the socket panel 6 can be substantially removed or at least partly reduced. In this way, the reliability of the panel-type electrical device 100 is improved.

In some embodiments, as shown in FIG. 4, the cushion blocks 3 are integrally formed on the corresponding mounting parts 102 of the socket assembly 1 and foldable between a first position and a second position relative to the corresponding mounting parts 102 of the socket assembly 1. The cushion blocks 3 may be in contact with the first surface 103 of the corresponding mounting parts 102 in the first position and in contact with the second surface 104 of the corresponding mounting parts 102 in the second position. As an example, the cushion blocks 3 may be made of polymer by injection molding process. As another example, it is also possible to prefabricate and adhere the cushion blocks 3 onto the corresponding mounting parts 102, for example, using glue. Scope of embodiments of the present disclosure does not intend to limit the manufacturing process of the mounting parts 102.

In some situations, if the socket assembly 1 provided with the cushion blocks 3 needs to be used alone, the cushion blocks 3 may be removed from the socket assembly 1. Thus, the separate use of the socket assembly 1 would not be affected.

Figure 5A:
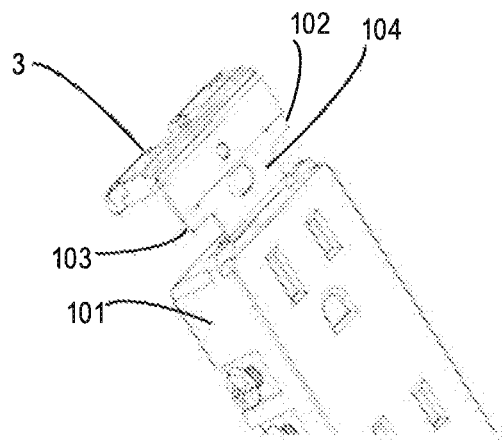
FIGS. 5A and 5B show an example folding process of the first pair of cushion blocks according to an embodiment of the present disclosure.
Figure 5B:
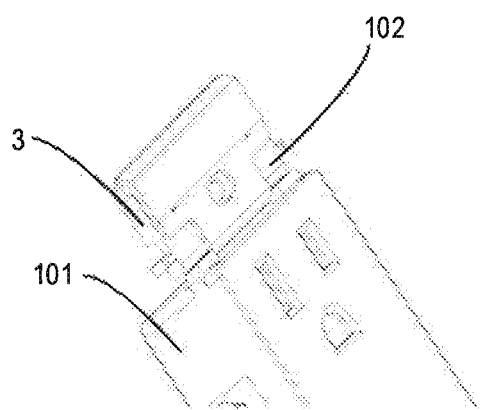

FIGS. 5A and 5B show an example folding process of the cushion blocks 3. As shown, the cushion blocks 3 may be folded toward and finally get in contact with the first surface 103 of the corresponding mounting parts 102. In this way, the cushion blocks 3 may be arranged between the mounting surface and the first surface 103 of the corresponding mounting parts 102 so as to increase the height of the socket body 101 with respect to the mounting surface.

In other embodiments, the cushion blocks 3 may be separate from the corresponding mounting parts 102 of the socket assembly 1. Upon assembling the panel-type electrical device 100, the cushion blocks 3 may be placed at any proper positions on the mounting surface firstly. Then, the mounting parts 102 of the socket assembly 1 may be aligned with the cushion blocks 3 and fixed to the mounting surface.

It is to be understood the cushion blocks 3 may be made of various materials, such as resin and other polymers. Moreover, the cushion blocks 3 may be made into various shapes, such as rectangular, semicircular, and other shapes.

Figure 6:
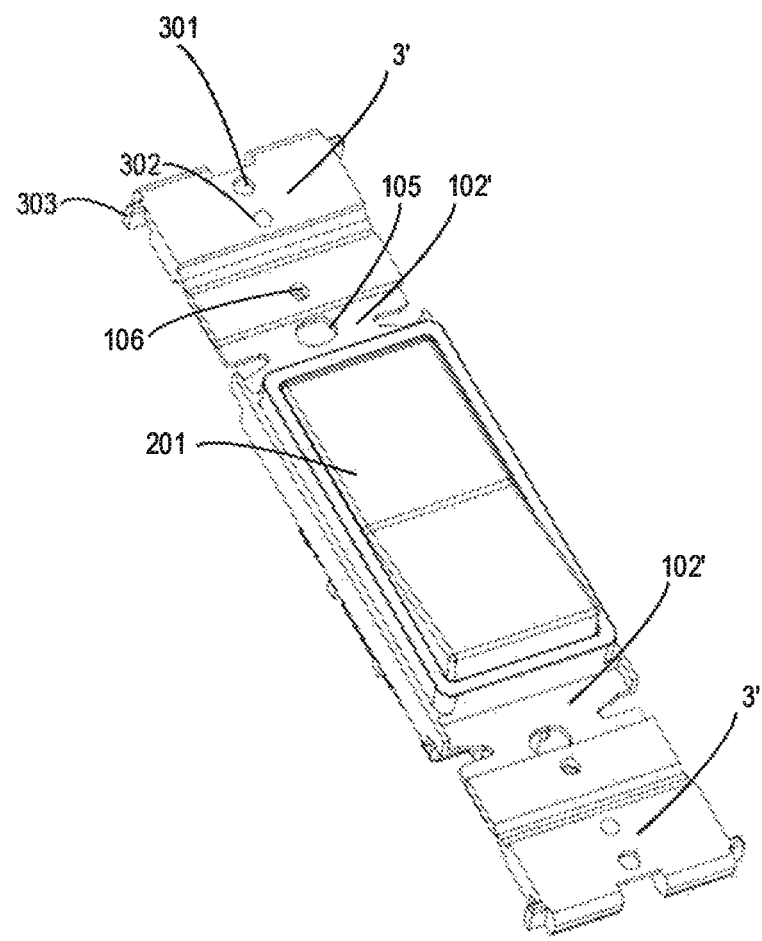
FIG. 6 shows a perspective view of a second pair of cushion blocks formed on the switch assembly according to an embodiment of the present disclosure.

In some embodiments, as shown in FIGS. 1 and 6, the panel-type electrical device 100 further comprises a second pair of cushion blocks 3'. The cushion blocks 3' may be arranged on the second surface 104 of the corresponding mounting parts 102' of the switch assembly 2. In an example, an overall thickness of one of the first pair of mounting parts 102 and the corresponding cushion block 3 is substantially equal to that of one of the second pair of mounting parts 102' and the corresponding cushion block 3'. In this way, the mounting positions of the socket assembly 1 and the switch assembly 2 may be interchangeable in the panel-type electrical device 100 and the reliability of the panel-type electrical device 100 may be further improved.

The cushion blocks 3' may be formed in the similar manner as the cushion blocks 3. For example, as shown in FIG. 6, the second pair of cushion blocks 3' are integrally formed on the corresponding mounting parts 102' of the switch assembly 2 and foldable between a first position and a second position relative to the corresponding mounting parts 102' of the switch assembly 2. The cushion blocks 3' may be in contact with the first surface 103 of the corresponding mounting parts 102' in the first position and in contact with the second surface 104 of the corresponding mounting parts 102' in the second position.

Figure 7A:
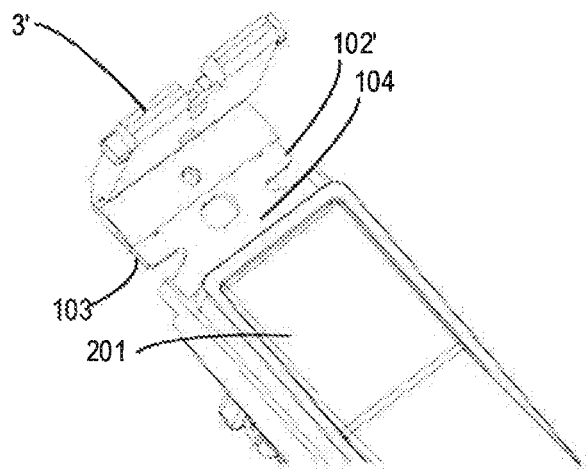
FIGS. 7A and 7B show an example folding process of the second pair of cushion blocks according to an embodiment of the present disclosure.
Figure 7B:
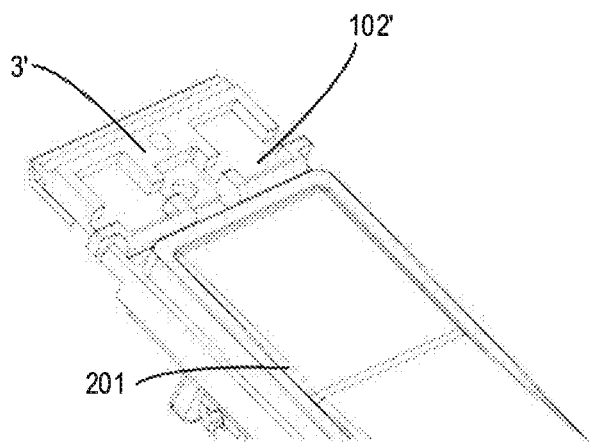

FIGS. 7A and 7B show an example folding process of the cushion blocks 3'. As shown, the cushion blocks 3' may be folded toward and finally get in contact with the second surface 104 of the corresponding mounting parts 102'. In this way, the cushion blocks 3' may be arranged on the second surface 104 of the corresponding mounting parts 102' of the switch assembly 2.

In other embodiments, the cushion blocks 3' may be separate from the corresponding mounting parts 102' of the switch assembly 2. Upon assembling the panel-type electrical device 100, the mounting parts 102 of the socket assembly 1 may be placed at proper positions on the mounting surface firstly. Then, the cushion blocks 3' may be placed on the corresponding mounting parts 102' of the switch assembly 2.

In some embodiments, as shown in FIGS. 2 and 3, each of the mounting parts 102, 102' comprises a first screw hole 105 so as to fix the socket assembly 1 and the switch assembly 2 on the mounting surface. With such arrangement, screws passing through the respective first screw hole 105 can be used to mount the socket assembly 1 and switch assembly 2 onto the mounting surface.

In some embodiments, as shown in FIGS. 4 and 6, each of the cushion blocks 3, 3' comprises a first through hole 301 aligned with the first screw hole 105 when the cushion blocks 3, 3' are folded to be in contact with the respective surfaces 103, 104 of the mounting parts 102, 102'. Upon assembling the panel-type electrical device 100, the first through hole 301 may allow the screws to pass through. In other embodiments, the first through hole 301 on the cushion blocks 3, 3' may be replaced by a large gap which also allow the screws to pass through.

Figure 8A:
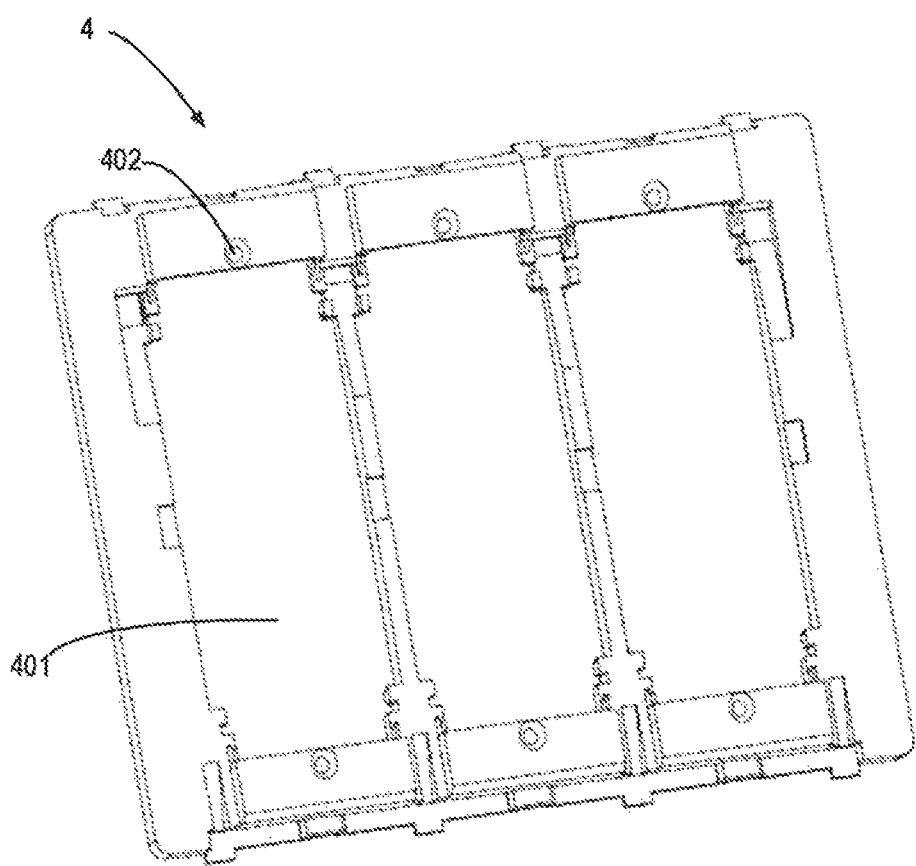
FIGS. 8A and 8B show perspective views of a bracket in different directions according to an embodiment of the present disclosure.
Figure 8B:
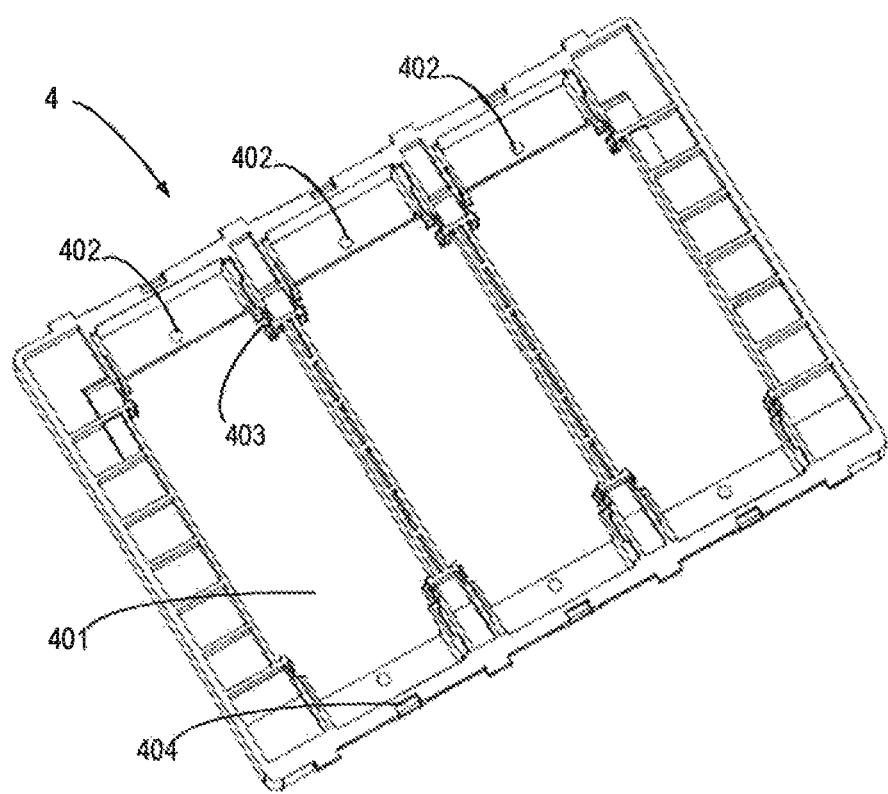
Figure 9A:
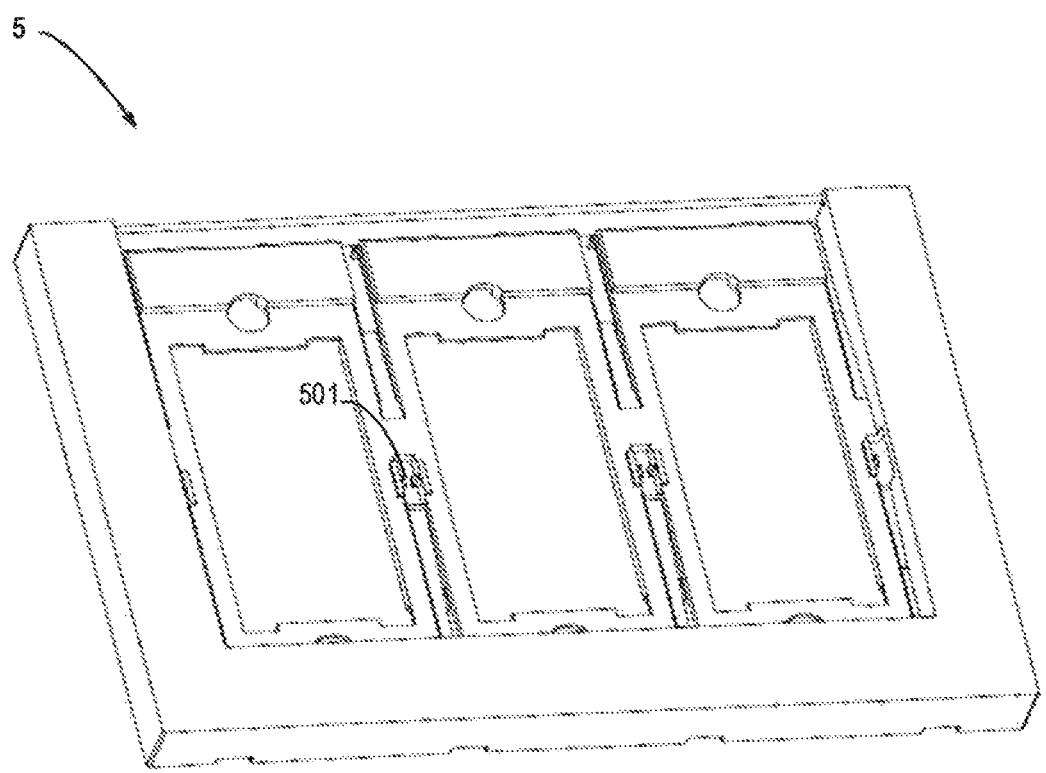
FIGS. 9A and 9B show perspective views of a frame in different directions according to an embodiment of the present disclosure.
Figure 9B:
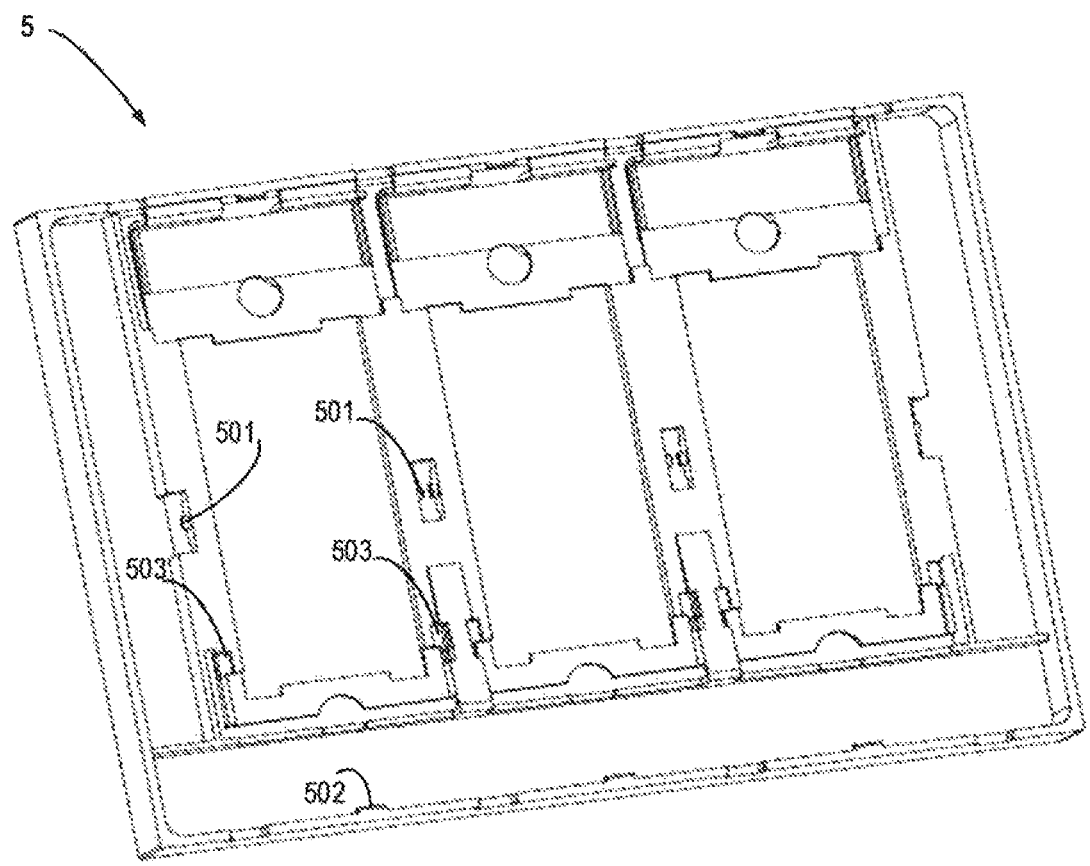

Return to FIG. 1, in some embodiments, the panel-type electrical device 100 further comprises a bracket 4 and a frame 5. The bracket 4 may be coupled to the mounting parts 102, 102' and include windows 401 for exposing the socket body 101 and the switch body 201. The frame 5 may be coupled to the bracket 4 and support the socket panel 6 and the switch panel 7. Example structure of the bracket 4 is shown in FIGS. 8A and 8B. Example structure of the frame 5 is shown in FIGS. 9A and 9B.

In some embodiments, each of the mounting parts 102, 102' may include a second screw hole 106 to facilitate fixing the bracket 4 onto the mounting parts 102, 102'. Accordingly, in those embodiments as shown in FIGS. 8A and 8B, the bracket 4 comprises a plurality of third screw holes 402 corresponding to the second screw hole 106. In this way, the bracket 4 can be fixed to the mounting parts 102, 102' in an effective and efficient manner in aid of screws passing through the plurality of third screw holes 402 and the respective second screw hole 106.

In some embodiments, as shown in FIGS. 4 and 6, each of the cushion blocks 3, 3' comprises a second through hole 302 aligned with the second screw hole 106 when the cushion blocks 3, 3' are folded to be in contact with the respective surfaces 103, 104 of the mounting parts 102, 102'. In assembling the panel-type electrical device 100, the second through hole 302 allows the screws to pass through.

In some embodiments, as shown in FIGS. 4 and 6, each of the cushion blocks 3, 3' comprises a positioning part 303 projecting from its main body. Accordingly, as shown in FIGS. 8A and 8B, the bracket 4 may include positioning grooves 403 adapted to receive the respective positioning part 303. In this way, upon assembling the panel-type electrical device 100, the cushion blocks 3, 3' may be readily arranged in proper positions.

In some embodiments, the frame 5 may be coupled to the bracket 4 through snap-fitting. To this end, as shown in FIGS. 8A and 8B, recesses 404 are arranged at the edge of the bracket 4, and as shown in FIGS. 9A and 9B, projection parts 502 are arranged at the edge of the frame 5. Upon fixing the frame 5 onto the bracket 4, the projection parts 502 may be pushed into the corresponding recesses 404.

Figure 10:
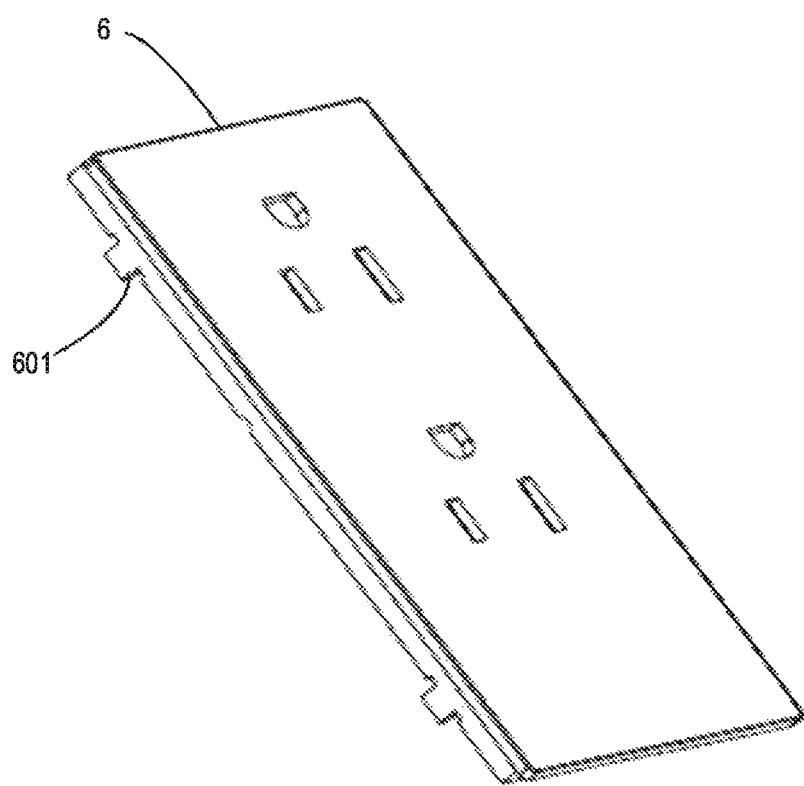
FIG. 10 shows a perspective view of a socket panel according to an embodiment of the present disclosure.

In some embodiments, the socket panel 6 is fixedly mounted on the frame 5 through snap-fitting. To this end, as shown in FIGS. 9A and 9B, receiving parts 503 are arranged on back side of the frame 5, and as shown in FIG. 10, projection parts 601 are arranged at opposite edges of the socket panel 6. Upon fixing the socket panel 6 onto the frame 5, the projection parts 601 may be pushed into the corresponding receiving parts 503.

Figure 11A:
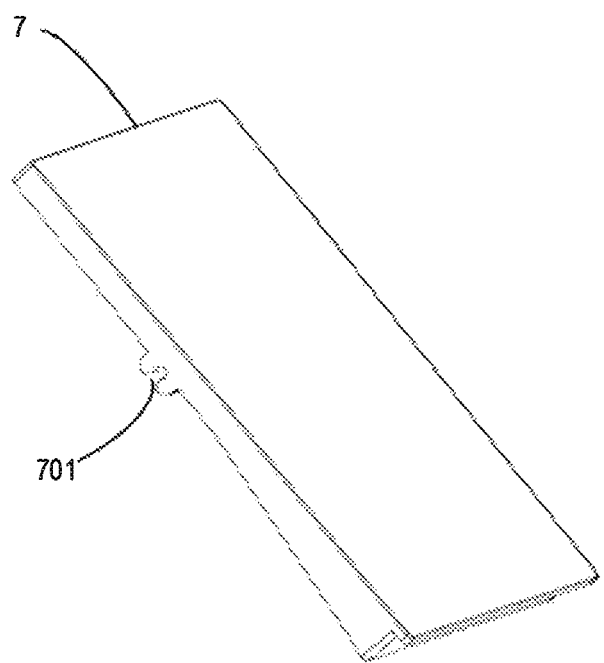
FIGS. 11A and 11B show perspective views of a switch panel in different directions according to an embodiment of the present disclosure.
Figure 11B:
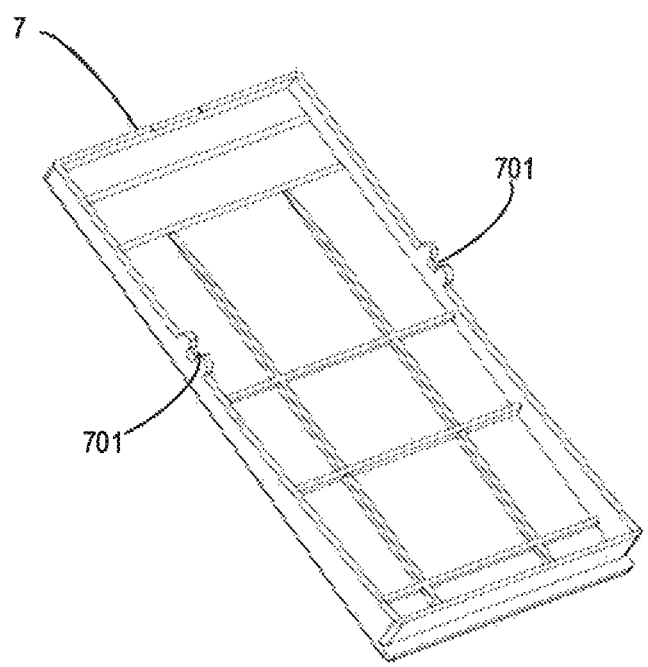

In some embodiments, as shown in FIGS. 9A and 9B, the frame 5 comprises a pair of positioning pillars 501 for supporting the switch panel 7. Accordingly, as shown in FIGS. 11A and 11B, the switch panel 7 comprises a pair of notches 701. The notches 701 may be mounted on the corresponding positioning pillars 501. In this way, the switch panel 7 may be rotatably mounted on the corresponding positioning pillars 501.

Figure 12A:
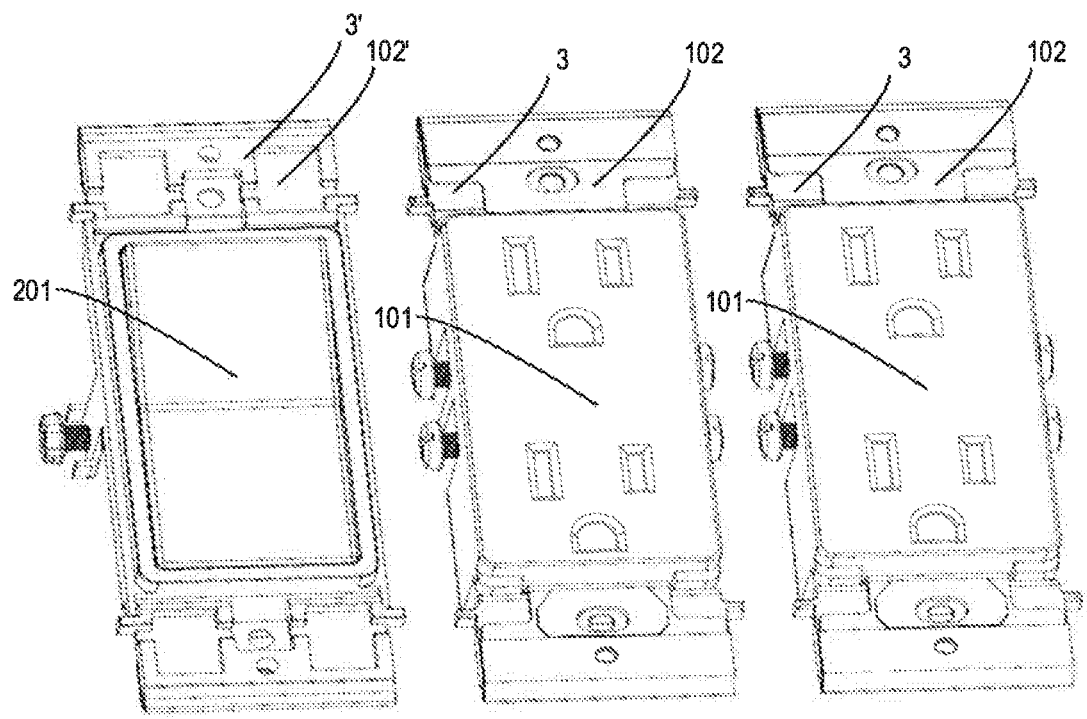
FIGS. 12A-12C show an example assembling process of the panel-type electrical device according to an embodiment of the present disclosure.
Figure 12B:
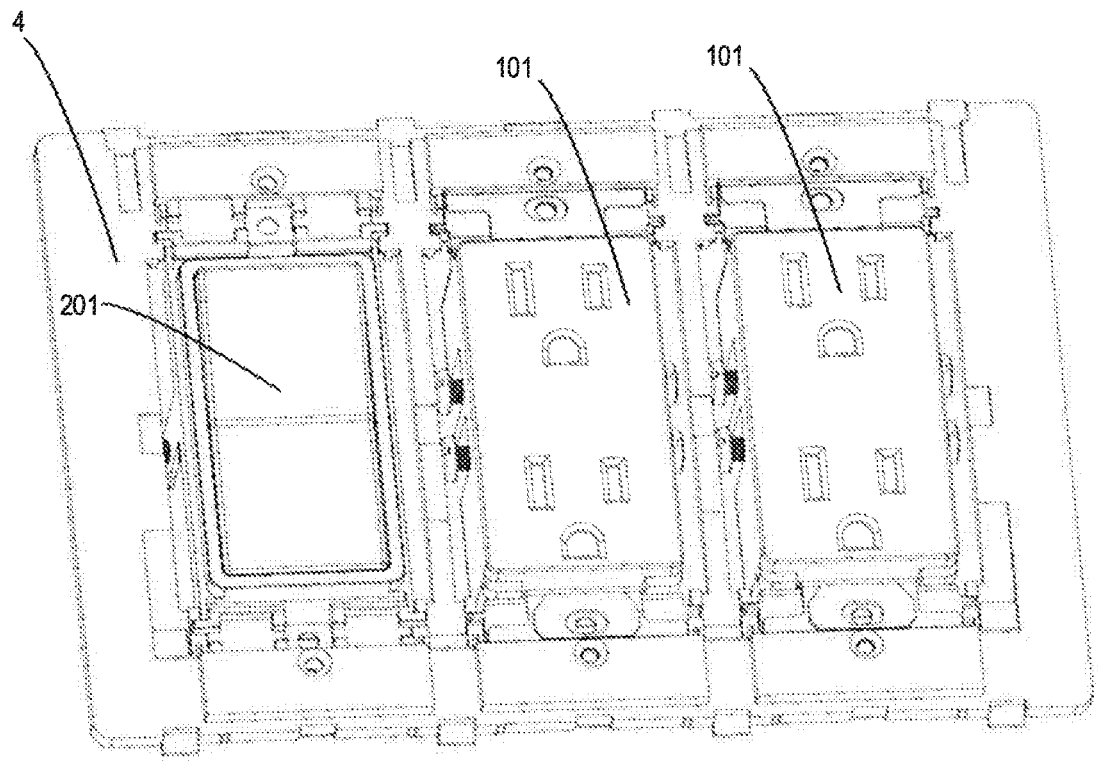
Figure 12C:
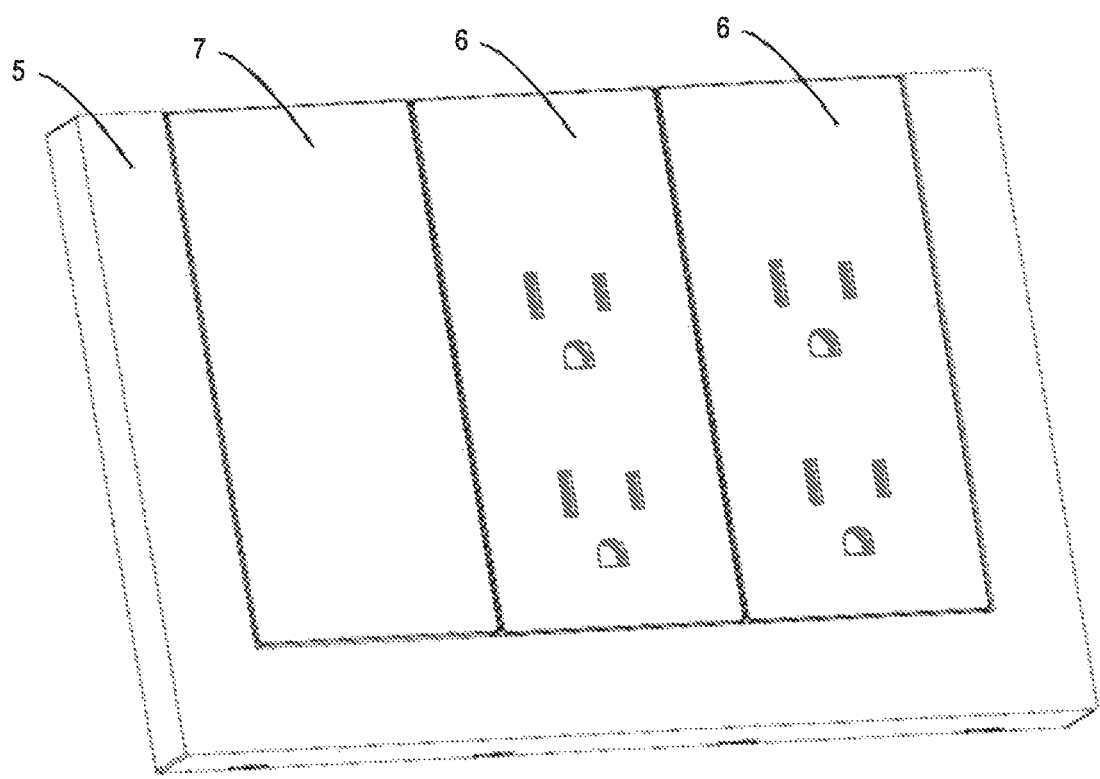

FIGS. 12A-12C show an example assembling process of the panel-type electrical device 100 according to an embodiment of the present disclosure.

As shown in FIG. 12A, the socket assembly 1 with the cushion blocks 3 and the switch assembly 2 with the cushion blocks 3' may be arranged side by side on the mounting surface. In FIG. 12A, the cushion blocks 3, 3' has already been folded to be in contact with the respective surfaces 103, 104 of the mounting parts 102, 102', and the mounting positions of the socket assembly 1 and the switch assembly 2 may be interchanged. As shown in FIG. 12B, the bracket 4 is fixed onto the mounting parts 102, 102' of the socket assembly 1 and the switch assembly 2. As shown in FIG. 12C, the frame 5 is fixed onto the bracket 4, and the socket panel 6 and the switch panel 7 are mounted onto the frame 5. As such, the assembling process of the panel-type electrical device 100 is finished. As discussed above, since the gap between the socket body 101 and the socket panel 6 is substantially removed or at least partly reduced, the reliability of the panel-type electrical device 100 may be improved.

The cushion blocks 3, 3' as discussed above can be used in an electrical assembly, for example. In some embodiments, the electrical assembly may include the socket assembly 1 and the first pair of cushion blocks 3 integrally formed on the mounting parts 102, as discussed above with reference to FIGS. 4 and 5A-5B. In other embodiments, the electrical assembly may include the switch assembly 2 and the second pair of cushion blocks 3' integrally formed on the mounting parts 102', as discussed above with reference to FIGS. 6 and 7A-7B.

Specifically, the electrical assembly may comprise a body, such as the socket body 101 or the switch body 201 as discussed above. A pair of mounting parts 102, 102' may be arranged on opposite sides of the body. The electrical assembly may be arranged on the mounting surface via the mounting parts 102, 102'. Each of the mounting parts 102, 102' may include a first surface 103 facing toward the mounting surface and a second surface 104 facing away from the mounting surface. Moreover, a pair of cushion blocks 3, 3' may be integrally formed on the corresponding mounting parts 102, 102' and foldable between a first position and a second position relative to the corresponding mounting parts 102, 102', as discussed above with reference to FIGS. 4-7B. The cushion blocks 3, 3' may be in contact with the first surface 103 of the corresponding mounting parts 102, 102' in the first position and in contact with the second surface 104 of the corresponding mounting parts 102, 102' in the second position. In this way, the mounting height of the electrical assembly on the mounting surface may adjusted according to different requirements.

As discussed above with reference to FIGS. 4-7B, each of the mounting parts 102, 102' may include a first screw hole 105, and the electrical assembly is mounted on the mounting surface by screws passing through the respective first screw hole 105. Moreover, each of the cushion blocks 3, 3' may include a first through hole 301 aligned with the first screw hole 105 in the first position or the second position.

It should be appreciated that the above detailed embodiments of the present disclosure are only to exemplify or explain principles of the present disclosure and not to limit the present disclosure. Therefore, any modifications, equivalent alternatives and improvement, etc. without departing from the spirit and scope of the present disclosure shall be comprised in the scope of protection of the present disclosure. Meanwhile, appended claims of the present disclosure aim to cover all the variations and modifications falling under the scope and boundary of the claims or equivalents of the scope and boundary.

What is claimed is:

1. A panel-type electrical device comprising:
   a socket assembly adapted to be coupled to a mounting surface and including a socket body and a first pair of mounting parts;
   a switch assembly adapted to be coupled to the mounting surface side by side with the socket assembly and including a switch body and a second pair of mounting parts, each of the mounting parts including a first surface facing toward the mounting surface and a second surface facing away from the mounting surface;
   a socket panel adapted to cover the socket body;
   a switch panel adapted to cover the switch body and move between at least two positions to control an operation state of the switch body, the switch panel being coplanar with the socket panel in one of the at least two positions;
   a first pair of cushion blocks adapted to be arranged between the mounting surface and the first surface of the corresponding mounting parts of the socket assembly such that the socket body abuts the switch panel; and
   a bracket coupled to the mounting parts of the socket assembly and the switch assembly and comprising windows for exposing the socket body and the switch body,
   wherein each of the first pair of cushion blocks comprises a positioning part, and the bracket comprises positioning grooves adapted to receive the respective positioning part, and
   wherein the first pair of cushion blocks are integrally formed on the corresponding mounting parts of the socket assembly and foldable between a first position and a second position relative to the corresponding mounting parts of the socket assembly, and the first pair of cushion blocks are in contact with the first surface of the corresponding mounting parts of the socket assembly in the first position and in contact with the second surface of the corresponding mounting parts of the socket assembly in the second position.

2. The panel-type electrical device according to claim 1, further comprising a second pair of cushion blocks adapted to be arranged on the second surface of the corresponding mounting parts of the switch assembly, wherein an overall thickness of one of the first pair of mounting parts and the corresponding cushion block is substantially equal to that of one of the second pair of mounting parts and the corresponding cushion block.

3. The panel-type electrical device according to claim 2, wherein the second pair of cushion blocks are integrally formed on the corresponding mounting parts of the switch assembly and foldable between a first position and a second position relative to the corresponding mounting parts of the switch assembly, and the second pair of cushion blocks are in contact with the first surface of the corresponding mounting parts of the switch assembly in the first position and in contact with the second surface of the corresponding mounting parts of the switch assembly in the second position.

4. The panel-type electrical device according to claim 1, wherein each of the mounting parts comprises a first screw hole, and the socket assembly and the switch assembly are mounted on the mounting surface by screws passing through the respective first screw hole.

5. The panel-type electrical device according to claim 4, wherein each of the first pair of cushion blocks comprises a first through hole aligned with the first screw hole.

6. The panel-type electrical device according to claim 1, further comprising:
   a frame coupled to the bracket and adapted to support the socket panel and the switch panel.

7. The panel-type electrical device according to claim 6, wherein each of the mounting parts comprises a second screw hole, the bracket comprises a plurality of third screw holes corresponding to the second screw hole, and the bracket is coupled to the mounting parts by screws passing through the plurality of third screw holes and the respective second screw hole.

8. The panel-type electrical device according to claim 7, wherein each of the first pair of cushion blocks comprises a second through hole aligned with the second screw hole.

9. The panel-type electrical device according to claim 6, wherein the frame is coupled to the bracket through snap-fitting.

10. The panel-type electrical device according to claim 6, wherein the socket panel is fixedly mounted on the frame through snap-fitting.

11. The panel-type electrical device according to claim 6, wherein the frame comprises a pair of positioning pillars, and the switch panel comprises a pair of notches rotatably mounted on the corresponding positioning pillars.

12. The panel-type electrical device according to claim 1, further comprising at least one additional socket assembly or at least one additional switch assembly.

13. An electrical assembly comprising:
    a body;
    a pair of mounting parts arranged on opposite sides of the body, the electrical assembly being adapted to be arranged on a mounting surface via the mounting parts, each of the mounting parts including a first surface facing toward the mounting surface and a second surface facing away from the mounting surface;
    a pair of cushion blocks integrally formed on the corresponding mounting parts and foldable between a first position and a second position relative to the corresponding mounting parts, the pair of cushion blocks being in contact with the first surface of the corresponding mounting parts in the first position and in contact with the second surface of the corresponding mounting parts in the second position; and
    a bracket coupled to the pair of mounting parts and comprising a window for exposing the body,
    wherein each of the pair of cushion blocks comprises a positioning part, and the bracket comprises positioning grooves adapted to receive the respective positioning part.

14. The electrical assembly according to claim 13, wherein each of the mounting parts comprises a first screw hole, and the electrical assembly is mounted on the mounting surface by screws passing through the respective first screw hole.

15. The electrical assembly according to claim 14, wherein each of the cushion blocks comprises a first through hole aligned with the first screw hole in the first position or the second position.

16. The electrical assembly according to claim 13, wherein the body comprises a socket body or a switch body.

* * * * *